US008746557B2

(12) United States Patent
Connell, II et al.

(10) Patent No.: US 8,746,557 B2
(45) Date of Patent: Jun. 10, 2014

(54) SECURE SELF-CHECKOUT

(75) Inventors: Jonathan H. Connell, II, Cortlandt-Manor, NY (US); Norman Haas, Mount Kisco, NY (US); Sharathchandra U. Pankanti, Norwalk, CT (US)

(73) Assignee: Toshiba Global Commerce Solutions Holding Corporation, Tokyo (JP)

( * ) Notice: Subject to any disclaimer, the term of this patent is extended or adjusted under 35 U.S.C. 154(b) by 723 days.

(21) Appl. No.: 12/037,266

(22) Filed: Feb. 26, 2008

(65) Prior Publication Data
US 2009/0212102 A1    Aug. 27, 2009

(51) Int. Cl.
*G06K 15/00*    (2006.01)
(52) U.S. Cl.
USPC .......................................... 235/383; 235/385
(58) Field of Classification Search
USPC ............... 235/375, 383, 385, 462.01, 462.14, 235/462.24, 462.41; 705/14.24, 14.37, 705/14.38
See application file for complete search history.

(56) References Cited

U.S. PATENT DOCUMENTS

| | | |
|---|---|---|
| 4,323,772 A | 4/1982 | Serge |
| 5,331,455 A | 7/1994 | Chang |
| 5,426,282 A | 6/1995 | Humble |
| 5,467,403 A | 11/1995 | Fishbine et al. |
| 5,477,379 A | 12/1995 | Chang |
| 5,497,314 A | 3/1996 | Novak |
| 5,513,264 A | 4/1996 | Wang et al. |
| 5,546,475 A | 8/1996 | Bolle et al. |
| 5,583,686 A | 12/1996 | Chen |
| 5,609,223 A | 3/1997 | Iizaka et al. |
| 5,631,976 A | 5/1997 | Bolle et al. |
| 5,635,697 A | 6/1997 | Shellhammer et al. |
| 5,649,970 A | 7/1997 | Connell et al. |
| 5,659,167 A | 8/1997 | Wang et al. |
| 5,763,864 A | 6/1998 | O'Hagan et al. |

(Continued)

FOREIGN PATENT DOCUMENTS

WO        0225506        3/2002

OTHER PUBLICATIONS

Bolle et al., "Veggie Vision: A Produce Recognition System", pp. 1-4, IEEE Workshop on Applications of Computer Vision, WACV 1996.

(Continued)

*Primary Examiner* — Tuyen K Vo
(74) *Attorney, Agent, or Firm* — Hoffman Warnick LLC

(57) ABSTRACT

Under the present invention, item verification is automated and expedited. Specifically, items to be purchased can be scanned by the shopper using a barcode reader (e.g., a scanner) attached to or positioned near the shopping receptacle. As items are scanned, they are identified based on their barcode and added to an item list. Item verification can then performed at checkout using imaging technology. For example, the shopping cart or shopping basket can be brought into the field of view of a computer-connected camera. The camera and computer can, working from the customer's item list developed when the items are scanned, observe each product in the receptacle and "ring it up". If all products can be accounted for, the customer is free to leave; otherwise the customer is denied egress, informed of the problem, etc. A store employee can also be signaled to investigate. The total time required to make the decision is the time to take a picture and process it, which by human standards is very fast; faster than existing verification methods.

25 Claims, 3 Drawing Sheets

(56) References Cited

U.S. PATENT DOCUMENTS

| | | | |
|---|---|---|---|
| 5,811,774 A | 9/1998 | Ju et al. | |
| 5,815,200 A | 9/1998 | Ju et al. | |
| 5,883,968 A | 3/1999 | Welch et al. | |
| 5,918,211 A | 6/1999 | Sloane | |
| 6,005,959 A | 12/1999 | Mohan et al. | |
| 6,032,128 A | 2/2000 | Morrison et al. | |
| 6,064,469 A | 5/2000 | Brownstein | |
| 6,122,409 A | 9/2000 | Boggs et al. | |
| 6,287,299 B1 | 9/2001 | Sasnett et al. | |
| 6,310,964 B1 | 10/2001 | Mohan et al. | |
| 6,366,696 B1 | 4/2002 | Hertz et al. | |
| 6,382,357 B1 | 5/2002 | Morrison et al. | |
| 6,434,530 B1 | 8/2002 | Sloane et al. | |
| 6,457,644 B1 | 10/2002 | Collins, Jr. et al. | |
| 6,504,481 B2 | 1/2003 | Teller | |
| 6,556,276 B2 | 4/2003 | Staeheli et al. | |
| 6,592,033 B2 | 7/2003 | Jennings et al. | |
| 6,606,171 B1 | 8/2003 | Renk et al. | |
| 6,726,094 B1 | 4/2004 | Rantze et al. | |
| 6,853,400 B1 | 2/2005 | Matama | |
| 6,991,158 B2 | 1/2006 | Munte | |
| 7,044,370 B2 | 5/2006 | Bellis et al. | |
| 7,118,026 B2 | 10/2006 | Harris et al. | |
| 7,124,058 B2 | 10/2006 | Namaky et al. | |
| 7,143,065 B1 | 11/2006 | Enright | |
| 7,159,770 B2 | 1/2007 | Onozu | |
| 7,168,618 B2 | 1/2007 | Schwartz | |
| 7,196,624 B2 | 3/2007 | Teller | |
| 7,202,780 B2 | 4/2007 | Teller | |
| 7,219,838 B2 | 5/2007 | Brewster et al. | |
| 7,334,729 B2 | 2/2008 | Brewington | |
| 7,337,960 B2 | 3/2008 | Ostrowski et al. | |
| 7,337,962 B2 | 3/2008 | Do et al. | |
| 7,398,923 B2 | 7/2008 | Do et al. | |
| 7,422,147 B2* | 9/2008 | Rosenbaum | 235/383 |
| 7,909,248 B1* | 3/2011 | Goncalves | 235/383 |
| 2001/0045463 A1 | 11/2001 | Madding et al. | |
| 2002/0004404 A1 | 1/2002 | Squibbs | |
| 2002/0013837 A1 | 1/2002 | Battat et al. | |
| 2002/0070861 A1 | 6/2002 | Teller | |
| 2002/0110374 A1 | 8/2002 | Staeheli et al. | |
| 2002/0121547 A1 | 9/2002 | Wieth et al. | |
| 2002/0161658 A1 | 10/2002 | Sussman | |
| 2002/0194074 A1 | 12/2002 | Jacobs | |
| 2003/0015585 A1* | 1/2003 | Wike et al. | 235/383 |
| 2003/0024982 A1 | 2/2003 | Bellis, Jr. et al. | |
| 2003/0071725 A1 | 4/2003 | Teller | |
| 2003/0167242 A1 | 9/2003 | Hamilton | |
| 2003/0222147 A1 | 12/2003 | Havens et al. | |
| 2004/0125396 A1 | 7/2004 | Burke | |
| 2004/0252025 A1* | 12/2004 | Silverbrook et al. | 340/568.5 |
| 2004/0262391 A1* | 12/2004 | Harris et al. | 235/454 |
| 2005/0096855 A1 | 5/2005 | Teller | |
| 2005/0145693 A1* | 7/2005 | Baitz et al. | 235/383 |
| 2005/0173527 A1 | 8/2005 | Conzola | |
| 2005/0189411 A1 | 9/2005 | Ostrowski et al. | |
| 2005/0189412 A1* | 9/2005 | Hudnut et al. | 235/383 |
| 2005/0200490 A1 | 9/2005 | Teller | |
| 2005/0211771 A1 | 9/2005 | Onozu | |
| 2005/0237213 A1 | 10/2005 | Teller | |
| 2005/0240478 A1 | 10/2005 | Lubow et al. | |
| 2006/0010033 A1 | 1/2006 | Thomas et al. | |
| 2006/0022051 A1 | 2/2006 | Patel et al. | |
| 2006/0032915 A1 | 2/2006 | Schwartz | |
| 2006/0047835 A1 | 3/2006 | Greaux | |
| 2006/0161390 A1 | 7/2006 | Namaky et al. | |
| 2006/0179164 A1 | 8/2006 | Katibian et al. | |
| 2006/0180664 A1 | 8/2006 | Barrett et al. | |
| 2006/0288133 A1 | 12/2006 | Katibian et al. | |
| 2006/0289637 A1* | 12/2006 | Brice et al. | 235/385 |
| 2006/0290980 A1 | 12/2006 | Terada | |
| 2007/0094080 A1 | 4/2007 | Wiken | |
| 2007/0107016 A1 | 5/2007 | Angel et al. | |
| 2007/0107017 A1 | 5/2007 | Angel et al. | |
| 2007/0107021 A1 | 5/2007 | Angel et al. | |
| 2007/0158417 A1* | 7/2007 | Brewington | 235/383 |
| 2007/0279244 A1 | 12/2007 | Haughawout et al. | |
| 2007/0288310 A1 | 12/2007 | Boos et al. | |
| 2008/0027796 A1 | 1/2008 | Chaves | |
| 2008/0059281 A1 | 3/2008 | Tower et al. | |
| 2008/0141755 A1 | 6/2008 | Edwards | |
| 2008/0142598 A1 | 6/2008 | Kwan | |
| 2008/0149710 A1* | 6/2008 | Silverbrook et al. | 235/383 |
| 2008/0149725 A1 | 6/2008 | Rosenbaum | |
| 2008/0154727 A1 | 6/2008 | Carlson | |
| 2008/0226129 A1 | 9/2008 | Kundu et al. | |
| 2009/0119168 A1 | 5/2009 | Otto et al. | |
| 2009/0145965 A1* | 6/2009 | Davis et al. | 235/383 |
| 2009/0268941 A1 | 10/2009 | French et al. | |
| 2010/0042236 A1 | 2/2010 | Chow | |
| 2011/0060634 A1 | 3/2011 | Grossman et al. | |
| 2011/0215147 A1* | 9/2011 | Goncalves | 235/383 |
| 2012/0030003 A1 | 2/2012 | Herwig | |
| 2012/0101881 A1 | 4/2012 | Taylor et al. | |
| 2013/0001295 A1* | 1/2013 | Goncalves | 235/375 |

OTHER PUBLICATIONS

Bolle et al., "Veggie Vision: A Produce Recognition System", pp. 1-8, 1996.

Connell II et al., U.S. Appl. No. 11/756,391, Office Action Communication, Dec. 2, 2009, 19 pages.

Connell II et al., U.S. Appl. No. 12/052,051, Office Action Communication, Feb. 23, 2009, 13 pages.

Connell II et al., U.S. Appl. No. 12/052,051, Office Action Communication, Jan. 6, 2010, 24 pages.

Connell II et al., U.S. Appl. No. 12/052,051, Office Action Communication, Sep. 8, 2009, 19 pages.

Connell II et al., U.S. Appl. No. 12/052,051, Office Action Communication, Jun. 26, 2009, 19 pages.

Connell II et al., U.S. Appl. No. 11/782,177, Office Action Communication, Nov. 24, 2009, 16 pages.

Connell II et al., U.S. Appl. No. 11/782,173, Office Action Communication, Nov. 27, 2009, 12 pages.

Connell II et al., U.S. Appl. No. 11/782,173, Office Action Communication, May 27, 2009, 12 pages.

Sahai, "Towards Distributed and Dynamic Network Management", IEEE, 1998, 10 pages.

Reesen, "Virtual World Technologies to Manage a Grid", IBM Corporation, 2008, 19 pages.

Derwent, Web based ordering system for non-standardised goods e.g. fruit, vegetables provides view of item for selection and prints bar code on item for order processing, Jul. 10, 1998, Abstract, 2 pages.

Connell II, et al., U.S. Appl. No. 11/782,177, Final Office Action, Apr. 23, 2010, 18 pages.

Connell II, et al., U.S. Appl. No. 12/052,046, Office Action, Apr. 2, 2010, 13 pages.

Connell II, et al., U.S. Appl. No. 11/782,173, Examiner's Answer, Apr. 30, 2010, 11 pages.

Connell II, et al., U.S. Appl. No. 11/756,391, Final Office Action, May 6, 2010, 18 pages.

Connell II, U.S. Appl. No. 12/052,051, Office Action Communication, Jun. 11, 2010, 32 pages.

Hai, U.S. Appl. No. 12/037,270, Office Action Communication, Aug. 6, 2010, 19 pages.

Kim, U.S. Appl. No. 11/756,382, Office Action Communication, Sep. 29, 2010, 26 pages.

Stanford, U.S. Appl. No. 12/112,318, Office Action Communication, Nov. 8, 2010, 20 pages.

Crosland, U.S. Appl. No. 12/052,046, Notice of Allowance & Fees Due, Oct. 7, 2010, 14 pages.

Johnson, U.S. Appl. No. 12/052,051, Office Action Communication, Dec. 23, 2010, 31 pages.

Basit, U.S. Appl. No. 12/037,270, Office Action Communication, Jan. 21, 2011, 13 pages.

Kim, U.S. Appl. No. 11/756,382, Notice of Allowance & Fees Due, Mar. 24, 2011, 11 pages.

Stanford, U.S. Appl. No. 12/112,318, Office Action Communication, May 3, 2011, 16 pages.

(56) References Cited

OTHER PUBLICATIONS

Basit, U.S. Appl. No. 12/037,270, Office Action Communication, Jun. 15, 2011, 22 pages.
Mehta, "Delta Adds Fee to Tickets Not Bought Online; Airlines: The $2 charge applies to all round-trip domestic flights not booked through its Web site. Travel agens criticize the move." Los Angeles Times, Jan. 14, 1999, ProQuest LLC, 3 pages.
Johnson, U.S. Appl. No. 12/052,051, Notice of Allowance & Fees Due, Jul. 14, 2011, 20 pages.
Basit, U.S. Appl. No. 12/037,270, Office Action Communication, Nov. 17, 2011, 21 pages.
Seth, U.S. Appl. No. 12/111,652, Office Action Communication, Dec. 1, 2011, 43 pages.
Stanford, U.S. Appl. No. 11/782,177, Office Action Communication, Jun. 19, 2012, 16 pages.
Stanford, U.S. Appl. No. 11/782,177, Office Action Communication, Feb, 28, 2012, 31 pages.
Stanford, U.S. Appl. No. 11/756,391, Office Action Communication, Mar. 12, 2012, 29 pages.
Seth, U.S. Appl. No. 12/111,652, Notice of Allowance & Fees Due, Mar. 14, 2012, 7 pages.
Stanford, U.S. Appl. No. 11/756,391, Office Action Communication, Aug. 15, 2012, 20 pages.
Rankins, U.S. Appl. No. 12/037,270, Notice of Allowance & Fees Due, 18 pages.
Vo, U.S. Appl. No. 11/782,173, Notice of Allowance & Fees Due, May 24, 2013, 38 pages.
Vo, U.S. Appl. No. 11/782,173, Decision on Appeal, Apr. 12, 2013, 7 pages.
Stanford, U.S. Appl. No. 11/756,391, Office Action Communication, Jun. 14, 2013, 22 pages.
Stanford, U.S. Appl. No. 11/782,177, Office Action Communication, Jun. 14, 2013, 25 pages.
Stanford, U.S. Appl. No. 11/756,391, Office Action dated Oct. 29, 2013, TTEC-0001, 17 pages.
Stanford, U.S. Appl. No. 11/782,177, Office Action dated Oct. 29, 2013, IBME-0443, 20 pages.
Stanford, U.S. Appl. No. 11/756,391, Notice of Allowance dated Mar. 20, 2014.

\* cited by examiner

SECURE SELF-CHECKOUT

CROSS-REFERENCE TO RELATED APPLICATIONS

This application is related in some aspects to the commonly owned and co-pending application entitled "Smart Scanning System," filed May 31, 2007, and which is assigned U.S. patent application Ser. No. 11/756,391, the entire contents of which are herein incorporated by reference. This application is related in some aspects to the commonly owned and co-pending application entitled "Portable Device-Based Shopping Checkout," filed May 31, 2007, and which is assigned U.S. patent application Ser. No. 11/756,382, the entire contents of which are herein incorporated by reference. This application is related in some aspects to the commonly owned and co-pending application entitled "Item Scanning System," filed Jul. 24, 2007, and which is assigned U.S. patent application Ser. No. 11/782,173, the entire contents of which are herein incorporated by reference.

FIELD OF THE INVENTION

The present invention generally relates to self-checkout (e.g., retail). Specifically, the present invention provides a way to improve the security of self-checkout for increased loss prevention.

BACKGROUND OF THE INVENTION

Shopping checkout (e.g., retail supermarket, etc.) is a process by which most everyone is familiar. Typical checkout involves a shopper navigating about a store collecting items/items for purchase. Often the shopper will utilize a shopping receptacle such as a shopping cart and/or shopping basket. Upon completion of gathering the desired items, the shopper will proceed to a checkout station for checkout (e.g., bagging and payment). In recent years, many stores have become equipped with self-checkout stations whereby a shopper will scan and bag the items his/herself, and then make payment via the self-checkout station.

A recent trend has been to allow the shopper to perform some of these functions as he/she navigates about the store. Unfortunately, none of the existing approaches provides a way to prevent device (e.g., scanner error) and/or theft (e.g., switching barcodes, not scanning items placed in the cart, etc.). Moreover, many of the existing approaches require expensive retrofitting of shopping receptacles, which themselves provide an increased security risk. In view of the foregoing, there exists a need for an approach that solves at least one of the deficiencies in the existing art.

It is desirable, when shoppers in supermarkets and other large retail stores self-check out, that the process be both as rapid as possible, to make the customer happy, and as secure as possible, to make the store happy. The more this process can be both instantaneous and 100% secure, the better. No existing process achieves these desired goals simultaneously. Self-checkout typically includes three separate functions that today are mostly lumped together at a single point of sale (POS) station: (1) enumerating each item to be purchased, and determining its price (typically, by presenting it to a bar code scanner); (2) verifying that each item is what it was claimed to be; and, (3) paying for all the items. With the advent of smart shopping carts that are already coming into service and similar devices, step 1 is being done at the time of item-pickup in the store aisles, and step 3 follows immediately, if the bill is charged against a credit card. This leaves step 2 as an area of potential bottleneck and security risk.

SUMMARY OF THE INVENTION

Under the present invention, item verification is automated and expedited. Specifically, items to be purchased can be scanned by the shopper using a barcode reader (e.g., a scanner), attached to or positioned near the shopping receptacle. As items are scanned, they are identified based on their barcode, and added to an item list. Item verification can then performed at checkout using imaging technology. For example, the shopping receptacle (shopping cart or basket) can be brought into the field of view of a computer-connected image capture device (e.g., camera). The camera and computer can, working from the customer's item list developed when the items are scanned, observe each product in the receptacle and "check it off". If all products can be accounted for, the customer is free to leave; otherwise the customer is denied egress, informed of the problem, etc. A store employee can also be signaled to investigate. The total time required to make the decision is the time to take a picture and process it, which by human standards is very fast; faster than existing verification methods.

A first aspect of the present invention provides a secure self-checkout method, comprising: receiving a set of scans of a set of barcodes corresponding to a set of items in a shopping receptacle; receiving a capturing of at least one image of the shopping receptacle; and verifying the set of items at checkout by determining whether an identity of the set of items based on the scan is consistent with an appearance of the set of items based on the at least one image.

A second aspect of the present invention provides a secure self-checkout system, comprising: a module for receiving a set of scans of a set of barcodes corresponding to a set of items in a shopping receptacle; a module for receiving a capturing of at least one image of the shopping receptacle; and a module for verifying the set of items at checkout by determining whether an identity of the set of items based on the scan is consistent with an appearance of the set of items based on the at least one image.

A third aspect of the present invention provides a program product stored on a computer readable medium for secure self-checkout, the computer readable medium comprising program code that causes a computer system to: receive a set of scans of a set of barcodes corresponding to a set of items in a shopping receptacle; receive a capturing of at least one image of the shopping receptacle; and verify the set of items at checkout by determining whether an identity of the set of items based on the scan is consistent with an appearance of the set of items based on the at least one image.

A fourth aspect of the present invention provides a method for deploying a system for secure self-checkout, comprising: providing a computer infrastructure being operable to: receive a set of scans of a set of barcodes corresponding to a set of items in a shopping receptacle; receive a capturing of at least one image of the shopping receptacle; and verify the set of items at checkout by determining whether an identity of the set of items based on the scan is consistent with an appearance of the set of items based on the at least one image.

A fifth aspect of the present invention provides computer software embodied in a computer readable medium for secure self-checkout, the computer readable medium comprising program code that causes a computer system to: receive a set of scans of a set of barcodes corresponding to a set of items in a shopping receptacle; receive a capturing of at least one image of the shopping receptacle; and verify the set of items at checkout by determining whether an identity of the set of items based on the scan is consistent with an appearance of the set of items based on the at least one image.

A sixth aspect of the present invention provides a computer-implement self-checkout business method, comprising: receiving a set of scans of a set of barcodes corresponding to a set of items in a shopping receptacle; receiving a capturing of at least one image of the shopping receptacle; and verifying the set of items at checkout by determining whether an identity of the set of items based on the scan is consistent with an appearance of the set of items based on the at least one image.

A seventh aspect of the present invention provides a data processing system for secure self-checkout, comprising: a memory medium having instructions; a bus coupled to the memory medium; and a processor coupled to the bus that when executing the instructions causes the data processing system to: receive a set of scans of a set of barcodes corresponding to a set of items in a shopping receptacle, receive a capturing of at least one image of the shopping receptacle, and verify the set of items at checkout by determining whether an identity of the set of items based on the scan is consistent with an appearance of the set of items based on the at least one image.

BRIEF DESCRIPTION OF THE DRAWINGS

These and other features of this invention will be more readily understood from the following detailed description of the various aspects of the invention taken in conjunction with the accompanying drawings in which.

Figure 1:
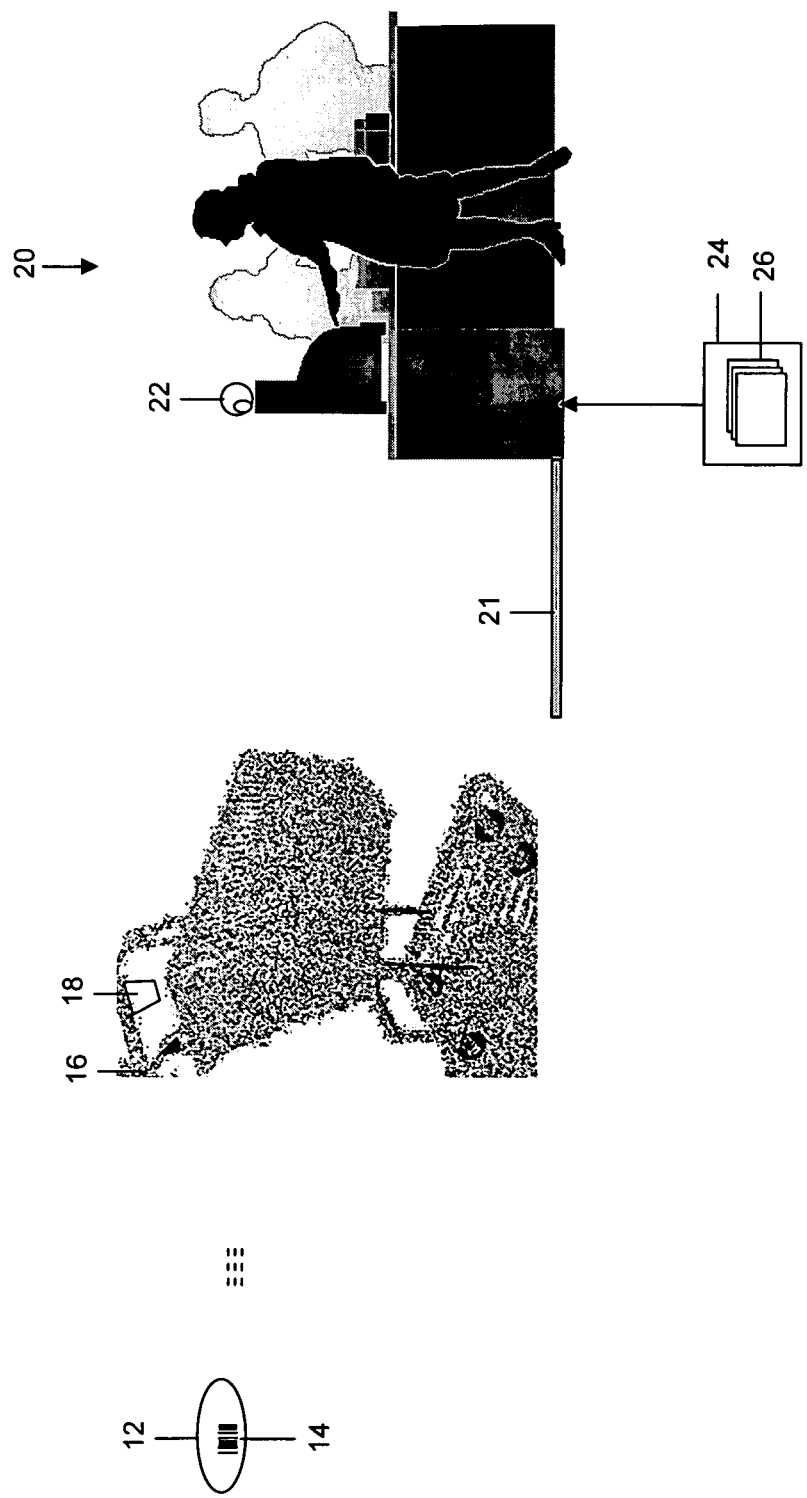
FIG. 1 depicts self-checkout according to one embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

As used herein, the following terms have the associated meanings:

"Set"—a quantity of at least one.

"Portable Device"—any wireless device such as a cellular telephone, personal digital assistant, etc., or any wired device capable of implementing the teachings given herein.

"Shopping Receptacle"—any container capable of holding items such as a shopping cart, a shopping basket, a shopping bag, etc.

"Image Capture Device"—means any type of camera or the like, such as a still image camera, a video camera, etc.

As indicated above, under the present invention, item verification is automated and expedited. Specifically, items to be purchased can be scanned by the shopper using a barcode reader (e.g., a scanner) attached to or positioned near the shopping receptacle. As items are scanned, they are identified based on their barcode and added to an item list. Item verification can then be performed at checkout using imaging technology. For example, the shopping cart or shopping basket (generically referred to herein as shopping receptacle) can be brought into the field of view of a computer-connected image capture device (e.g., camera). The camera and computer can, working from the customer's item list developed when the items are scanned, observe each product in the receptacle and "ring it up", checking it off the list in the process. If all products can be accounted for, the customer is free to leave; otherwise the customer is denied egress, informed of the problem, etc. A store employee can also be signaled to investigate. The total time required to make the decision is the time to take a picture and process it, which by human standards is very fast; faster than existing verification methods.

Referring now to FIG. 1, secure self-checkout according to one embodiment of the present invention is shown. Specifically, under the present invention, a shopping cart 16 can be fitted with a barcode reader 18. As items such as item 12 are selected by the purchaser, the barcode 14 printed on it can be scanned via barcode reader 18. This will result in item 12 being added to a list of items the purchaser intends to purchase. If the purchaser subsequently decides not to purchase the item, a control on barcode reader 18 can be selected and barcode 14 will be scanned, resulting in removal of item 12 from the list. Depending on the type of software loaded in barcode reader 18, the identity of item 12 could be determined at this stage by cross-referencing barcode 14 (the values corresponding thereto) against a database of barcodes to items.

It should be understood that barcode reader 18 need not be attached to shopping cart 16, rather it could be retrofitted onto/within a portable device (e.g., a cellular phone) such as described in the above-incorporated application entitled "Portable Device-Based Shopping Checkout". As stated therein, the portable device would first be configured for shopping checkout. In a typical embodiment, configuration will be enabled by a provider and will generally include: registering the portable device for shopping checkout (e.g., providing user/shopper contact information, pin number/password for using portable device, etc.); providing a unique identifier to the portable device; and providing software to the portable device. Such software would include a set of modules that are configured to: receive and process a scan of a barcode of an item; and determine an identity of the item based on the scan. Still yet, the set of modules can be configured to link with a checkout station; and arrange payment for the item.

In any event, once the purchaser is ready for checkout, the item list will be verified and payment will be made. In the former case, shopping cart 16 will be brought into the field of view of image capture device 22, and optionally be placed on scale 21. Image capture device 22 will capture at least one image of shopping cart and/or its items, filter and background artifacts (non-items such as the cart and anything in the background), to leave only the actual items intended to be purchased. The sequence of capturing and processing the image(s) typically is as follows: wait for low motion in the field of view; take dark and bright pictures; segment items from the background; extract at least one visual feature of item 12 and determine the identity of the items based on those visual features. These steps include the step of processing the at least one image so that the set of items in cart 16 can be individually identified and verified. Regardless, the identity determination can be based on comparison of the image to an electronic database or library of images associated with corresponding item identities. In addition, the appearance can be as general or as specific as desired. For example, the appearance can be specific so as to identify the item (e.g., a bottle of X brand cola), or it can be more general (e.g., a bottle of cola, or just cola based on the color).

Thereafter the item list will be verified. Specifically, the software in the computer/register will determine whether the appearance of the items based on the image(s) is (are) consistent with the identity of the items as determined from the barcodes. The computer register is programmed to register a discrepancy if the identity is inconsistent with the appearance, and provide a notification of the discrepancy, the notification being at least one of a visual notification and/or an audible notification. However, if the list is successfully verified, checkout will proceed. Verification can be further enhanced by comparing a weight of shopping cart 16 with an expected weight. This can be done using the known or approximate weights of the items in the item list. Once again, failure to verify can result in an error/notification being registered while successful verification will result in continuation of the checkout process.

Figure 2:
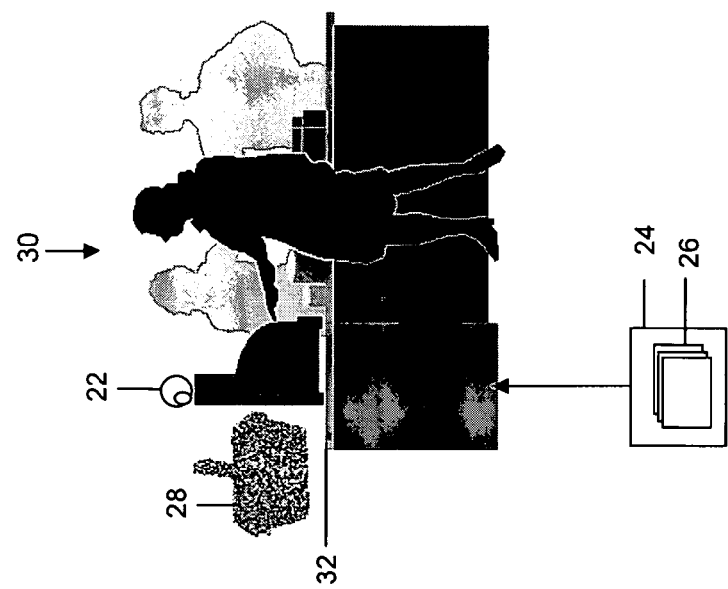
FIG. 2 depicts self-checkout according to another embodiment of the present invention.
Figure 2:
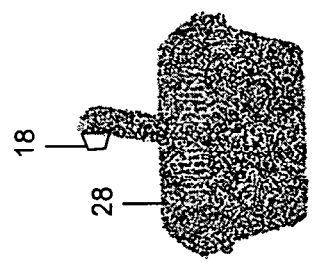
Figure 2:
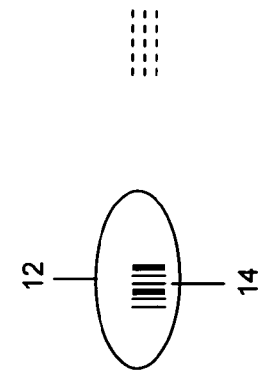

Referring to FIG. 2, another embodiment of the present invention is shown. In this case, the shopping receptacle is basket 28. Other than this one distinction, the functions/features of the invention are as stated above in conjunction with FIG. 1. Specifically, under the present invention, basket 28 can be fitted with a barcode reader 18. As items such as item 12 are selected by the purchaser, the barcode 14 corresponding thereto can be scanned via barcode reader 18. This will result in item 12 being added to a list of items the purchaser intends to purchase. If the purchaser subsequently decides not to purchase the item, a control on barcode reader 18 can be selected and barcode 14 will be scanned, resulting in removal of item 12 from the list. Depending on the type of software loaded in barcode reader 18, the identity of item 12 could be determined at this stage by cross-referencing barcode 14 (the values corresponding thereto) against a database of barcodes to items.

It should be understood that barcode reader 18 need not be attached to basket 28, rather it could be retrofitted onto/within a portable device (e.g., a cellular phone) such as described in the above-incorporated application entitled "Portable Device-Based Shopping Checkout". Such an embodiment was described above and will not be re-described here, for brevity.

In any event, once the purchaser is ready for checkout, the item list will be verified, and payment will be made. In the case of the former, basket 28 will be brought into the field of view of image capture device 22, and optionally be placed on scale 32. Image capture device 22 will capture at least one image of shopping cart, filter any background artifacts (non-items such as the cart and anything in the background) to leave only the actual items intended to be purchased. The sequence of capturing and processing the image(s) typically is as follows: wait for low motion; take dark and bright pictures; segment items from the background 30; extract at least one visual feature of item 12 and determine the identity based on those visual features. These steps include the step of processing the at least one image so that the set of items 12 in basket 28 can be individually identified and verified. Regardless, the identity determination can be based on comparison of the image to an electronic database or library of images associated with corresponding item identities. In addition, the appearance can be as general or as specific as desired. For example, the appearance can be specific so as to identify the item (e.g., a bottle of X brand cola), or it can be more general (e.g., a bottle of cola, or just cola based on the color).

The item list will then be verified. Specifically, the software in the computer/register will determine whether the appearance of the items based on the at least on image is consistent with the identity of the items as determined from the barcodes. The computer register is programmed to register a discrepancy if the identity is inconsistent with the appearance, and provide a notification of the discrepancy, the notification being at least one of a visual notification and/or an audible notification. However, if the list is successfully verified, checkout will proceed. Verification can be further enhanced by comparing the weight of basket 28 with an expected weight (determined from scale 32). This can be done using the known or approximate weights of the items in the item list. Once again, failure to verify can result in an error/notification being registered while successful verification can result in continuation of the checkout process.

It should be understood that in either embodiment (FIG. 1 or FIG. 2), the appearance of items can be determined by cross-referencing a database of items using the captured image(s). Further, although identification of items was initially described herein as occurring upon being scanned, such identification would be determined at the computer/register. In such a case, the scanning would still occur as items are selected, which would result in storage of the barcodes. Then, the identification from the scanned barcodes would occur when the barcode reader was "synched" with the computer/register. Regardless, verification based on the captured images would still occur. In addition, although image capture device 22 was shown as being external to computer/register, this need not be the case. Rather, image capture device 22 could be integrated within an integrated scanning and image capture unit as described in any of the above-incorporated patent applications.

II. Computerized Implementation

Figure 3:
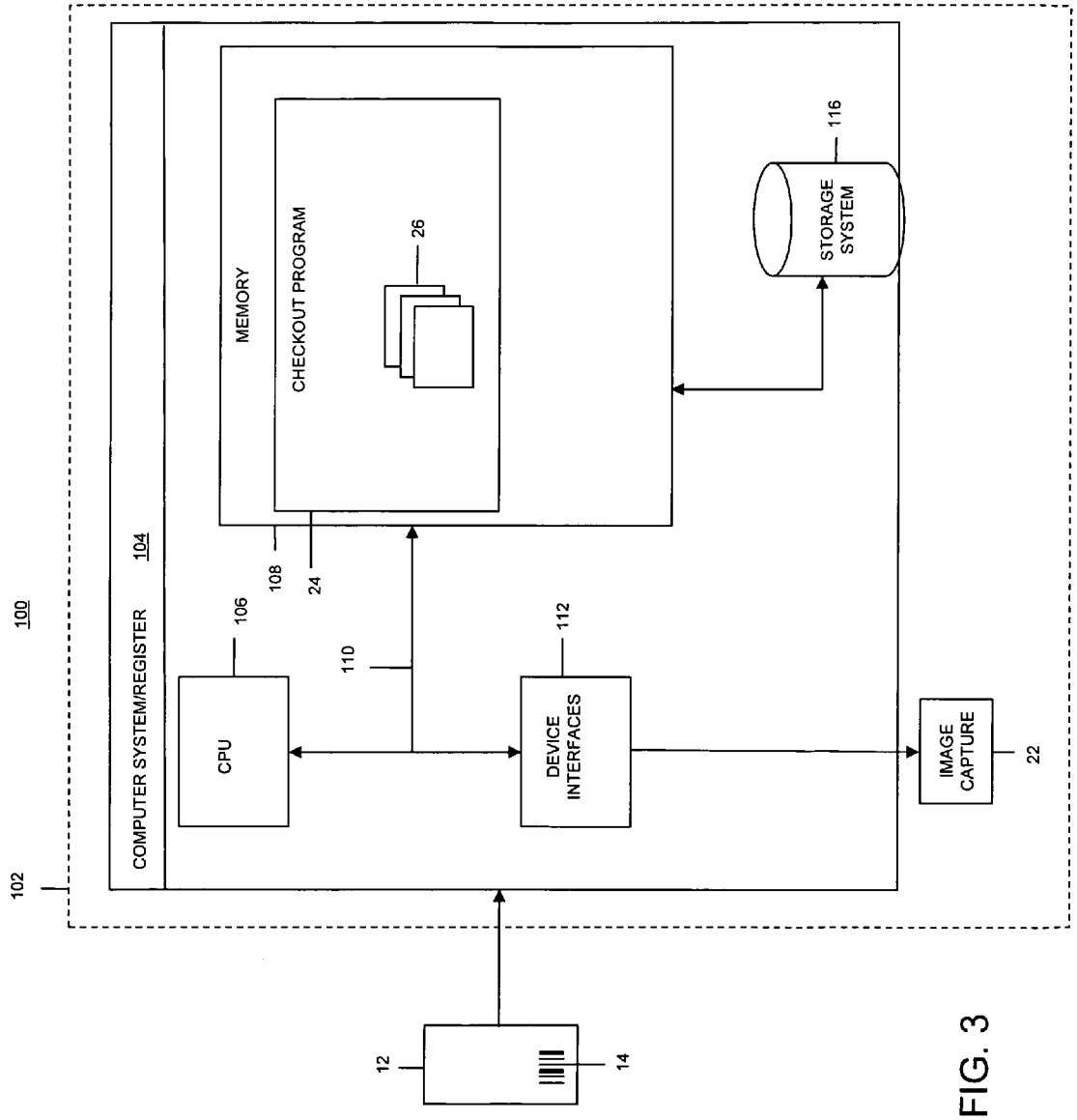
FIG. 3 depicts a more specific computerized implementation according to the present invention.

Referring now to FIG. 3, a computerized implementation 100 of the present invention is shown. As depicted, implementation 100 includes computer system/register 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system/register 104 includes a processing unit 106, a memory 108, a bus 110, and device interfaces 112. Further, computer system/register 104 is shown having image capture device 22 and storage system 116 that communicate with bus via device interfaces (although image capture device 22 alternatively could directly communicate with bus 110). In general, processing unit 106 executes computer program code, such as checkout software/program 24, which is stored in memory 108 and/or storage system 116.

While executing computer program code, processing unit 106 can read and/or write data to/from memory 108, storage system 116, and/or device interfaces 112. Bus 110 provides a communication link between each of the components in computer system/register 104. Although not shown, computer system/register 104 could also include I/O interfaces that communicate with: one or more external devices such as a kiosk, a checkout station, a keyboard, a pointing device, a display, etc.); one or more devices that enable a user to interact with computer system/register 104; and/or any devices (e.g., network card, modem, etc.) that enable computer system/register 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system/register 104 is only representative of various possible computer systems that can include numerous combinations of hardware. To this extent, in other embodiments, computer system/register 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 3 can be included in computer system/register 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system/register 104.

Shown in memory 108 of computer system/register 104 is checkout program 24, with a set of modules 26. The modules 26 generally provide the functions of the present invention as described herein. Specifically (among other things), set of modules 26 is configured to: determine an identity of item 12 based on a scan of barcode 14; determine an appearance of the item 12 based on at least one image captured via image capture device 22; process the at least one image so that the set of items in the cart/basket can be individually identified and verified; verify a list of items by determining whether their identities based on the barcode scan is consistent with their appearances as determined from the image(s). Set of modules 26 can also be configured to: receive weight information from a linked scale, register discrepancies where item lists cannot be verified by their appearance and/or weight, communicate notifications, arrange payment for verified items, etc.

While shown and described herein as secure self-checkout, it is understood that the invention further provides various alternative embodiments. For example, in one embodiment, the invention provides a computer-readable/useable medium that includes computer program code to enable a computer infrastructure to provide secure self-checkout. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide secure self-checkout and/or configuration of portable devices for shopping checkout. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for secure self-checkout. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system/register 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A secure self-checkout method, comprising:
receiving a set of scans of a set of barcodes corresponding to a set of items in a shopping receptacle, the set of scans having been performed prior to arrival at a checkout area;
determining a scanned identity of each of the set of items based on the set of scans;
receiving a capturing of at least one image of the shopping receptacle that includes the set of items in the shopping receptacle at the checkout area, the shopping receptacle containing all of the set of items for purchase during the capturing;
determining a visual identity of each of the set of items in the shopping receptacle based on a comparison of the at least one image with a set of images in a library; and
verifying, during checkout, that all of the set of items in the shopping receptacle have been previously scanned by:
comparing the scanned identity of each of the set of items with the visual identity of each of the set of items to determine whether the scanned identity of each of the set of items is consistent with the visual identity of each of the set of items in the shopping receptacle; and
comparing a weight of the shopping receptacle and the items in the shopping receptacle with an expected weight of the shopping receptacle and the items in the shopping receptacle to determine whether the weight of the shopping receptacle and the items in the shopping receptacle is consistent with the expected weight of the shopping receptacle and the items in the shopping receptacle.

2. The self-checkout method of claim 1, further comprising automatically processing payment of the set of items if the set of items are successfully verified.

3. The self-checkout method of claim 1, the set of scans being received via at least one barcode reader positioned near the shopping receptacle.

4. The self-checkout method of claim 1, the at least one image being captured by an image capture device positioned near a checkout station, and the method further comprising separating the at least one image into the set of items.

5. The self-checkout method of claim 4, the image capture device being integrated with a bar code scanner at the checkout station.

6. The self-checkout method of claim 5, the image capture device being selected from a group consisting of a still image camera and a video camera.

7. The self-checkout method of claim 1, further comprising:
registering a discrepancy if the scanned identity is inconsistent with the visual identity; and
providing a notification of the discrepancy, the notification being at least one of a visual notification and/or an audible notification.

8. The self-checkout method of claim 1, further comprising:
segmenting the at least one image from a background; and
extracting at least one visual feature of the item to determine the visual identity.

9. A secure self-checkout system, comprising:
a module for receiving a set of scans of a set of barcodes corresponding to a set of items in a shopping receptacle and determining a scanned identity of each of the set of items based on the set of scans, the set of scans having been performed prior to arrival at a checkout area;
a module for receiving a capturing of at least one image of the shopping receptacle that includes the set of items in the shopping receptacle at the checkout area, the shopping receptacle containing all of the set of items for purchase during the capturing;
a module for processing the at least one image to individually reveal the set of items and determining a visual identity of each of the set of items in the shopping receptacle based on a comparison of the at least one image with a set of images in a library; and
a module for verifying, during checkout, that all of the set of items in the shopping receptacle have been previously scanned by:
comparing the scanned identity of each of the set of items with the visual identity of each of the set of items to determine whether the scanned identity of each of the set of items is consistent with the visual identity of each of the set of items in the shopping receptacle, and
comparing the weight of the shopping receptacle and the items in the shopping receptacle with the expected weight of the shopping receptacle and the items in the shopping receptacle to determine whether the weight of the shopping receptacle and the items in the shopping receptacle is consistent with the expected weight of the shopping receptacle and the items in the shopping receptacle.

10. The self-checkout system of claim 9, further comprising a module for automatically processing payment of the set of items if the set of items are successfully verified.

11. The self-checkout system of claim 9, the set of scans being received via at least one barcode reader positioned near the shopping receptacle.

12. The self-checkout system of claim 9, the at least one image being captured by an image capture device positioned near a checkout station.

13. The self-checkout system of claim 12, the image capture device being integrated with a bar code scanner at the checkout station.

14. The self-checkout system of claim 13, the image capture device being selected from a group consisting of a still image camera and a video camera.

15. The self-checkout system of claim 9, further comprising:
   a module for registering a discrepancy if the scanned identity is inconsistent with the visual identity; and
   a module for providing a notification of the discrepancy, the notification being at least one of a visual notification and/or an audible notification.

16. The self-checkout system of claim 9, further comprising:
   a module for segmenting the at least one image from a background; and
   a module for extracting at least one visual feature of the item to determine the visual identity.

17. A program product stored on a computer readable medium for secure self-checkout, the computer readable medium comprising program code that causes a computer system to:
   receive a set of scans of a set of barcodes corresponding to a set of items in a shopping receptacle, the set of scans having been performed prior to arrival at a checkout area;
   determine a scanned identity of each of the set of items based on the set of scans;
   receive a capturing of at least one image of the shopping receptacle that includes the set of items in the shopping receptacle at the checkout area, the shopping receptacle containing all of the set of items for purchase during the capturing;
   determine a visual identity of each of the set of items in the shopping receptacle based on a comparison of the at least one image with a set of images in a library; and
   verify, during checkout, that all of the set of items in the shopping receptacle have been previously scanned by:
      comparing the scanned identity of each of the set of items with the visual identity of each of the set of items to determine whether the scanned identity of each of the set of items is consistent with the visual identity of each of the set of items in the shopping receptacle, and
      comparing the weight of the shopping receptacle and the items in the shopping receptacle with the expected weight of the shopping receptacle and the items in the shopping receptacle to determine whether the weight of the shopping receptacle and the items in the shopping receptacle is consistent with the expected weight of the shopping receptacle and the items in the shopping receptacle.

18. The program product of claim 17, the computer readable medium further comprising program code that causes the computer system to automatically process payment of the set of items if the set of items are successfully verified.

19. The program product of claim 17, the set of scans being received via at least one barcode reader positioned near the shopping receptacle.

20. The program product of claim 17, the at least one image being captured by an image capture device positioned near a checkout station.

21. The program product of claim 20, the image capture device being integrated with a bar code scanner at the checkout station.

22. The program product of claim 21, the image capture device being selected from a group consisting of a still image camera and a video camera.

23. The program product of claim 17, the computer readable medium further comprising program code that causes the computer system to:
   register a discrepancy if the scanned identity is inconsistent with the visual identity; and
   provide a notification of the discrepancy, the notification being at least one of a visual notification and/or an audible notification.

24. The program product of claim 17, the computer readable medium further comprising program code that causes the computer system to:
   segment the at least one image from a background; and
   extract at least one visual feature of the item to determine the visual identity.

25. A method for deploying a system for secure self-checkout, comprising:
   providing a computer infrastructure being operable to:
      receive a set of scans of a set of barcodes corresponding to a set of items in a shopping receptacle, the set of scans having been performed prior to arrival at a checkout area;
      determine a scanned identity of each of the set of items based on the set of scans;
      receive a capturing of at least one image of the shopping receptacle that includes the set of items in the shopping receptacle at the checkout area, the shopping receptacle containing all of the set of items for purchase during the capturing;
      determine a visual identity of each of the set of items in the shopping receptacle based on a comparison of the at least one image with a set of images in a library; and
      verify, during checkout, that all of the set of items in the shopping receptacle have been previously scanned by:
         comparing the scanned identity of each of the set of items with the visual identity of each of the set of items to determine whether the scanned identity of each of the set of items is consistent with the visual identity of each of the set of items in the shopping receptacle, and
         comparing the weight of the shopping receptacle and the items in the shopping receptacle with the expected weight of the shopping receptacle and the items in the shopping receptacle to determine whether the weight of the shopping receptacle and the items in the shopping receptacle is consistent with the expected weight of the shopping receptacle and the items in the shopping receptacle.

* * * * *